(12) United States Patent
Harder et al.

(10) Patent No.: US 6,866,316 B1
(45) Date of Patent: Mar. 15, 2005

(54) FRAME TO VEHICLE CARGO AREA MOUNTING

(75) Inventors: Scott Brant Harder, Grand Blanc, MI (US); Clover Suzanne Aguayo, Pontiac, MI (US); Richard Euel Henderson, Knoxville, TN (US); Robert Chris Tanton, Deckerville, MI (US); Gerard A. Whitney, Cincinnati, OH (US)

(73) Assignee: Durakon Acquisition Corp., Lapeer, MI (US)

( * ) Notice: Subject to any disclaimer, the term of this patent is extended or adjusted under 35 U.S.C. 154(b) by 0 days.

(21) Appl. No.: 10/445,368

(22) Filed: May 23, 2003

Related U.S. Application Data

(63) Continuation-in-part of application No. 29/181,797, filed on May 15, 2003.

(51) Int. Cl.[7] .............................................. B60R 11/06
(52) U.S. Cl. ................................ 296/26.09; 296/26.08; 296/37.6; 248/300; 248/310
(58) Field of Search ......................... 296/26.09, 26.08, 296/37.6; 248/300, 310, 298.1, 220.42; 414/522

(56) References Cited

U.S. PATENT DOCUMENTS

| | | | | |
|---|---|---|---|---|
| 2,973,176 A | * | 2/1961 | Malafouris ............... 248/228.3 |
| 3,870,266 A | | 3/1975 | MacDonald ............... 248/235 |
| 3,948,650 A | | 4/1976 | Flemings et al. |
| 4,465,118 A | | 8/1984 | Dantzig et al. |
| 4,681,360 A | * | 7/1987 | Peters et al. ............... 296/37.6 |
| 4,694,881 A | | 9/1987 | Busk |
| 4,824,158 A | * | 4/1989 | Peters et al. ............... 296/37.6 |
| 4,909,558 A | * | 3/1990 | Roshinsky ................. 296/37.6 |
| D315,289 S | | 3/1991 | Rankin ....................... D8/373 |
| 5,306,064 A | | 4/1994 | Padovano et al. .......... 296/24.1 |
| D349,639 S | | 8/1994 | Kimbrell .................... D8/349 |
| D356,166 S | | 3/1995 | Spiller ........................ D25/68 |
| 5,553,981 A | | 9/1996 | Braden ....................... 410/116 |
| 5,620,160 A | | 4/1997 | Grabe ......................... 248/235 |
| 5,927,111 A | | 7/1999 | Nachbauer ................. 70/161 |
| 5,938,262 A | * | 8/1999 | Mills ......................... 296/26.09 |
| 6,328,364 B1 | | 12/2001 | Darbishire ................. 296/26.09 |
| 6,364,267 B1 | | 4/2002 | Pearce ....................... 248/304 |
| 6,390,525 B2 | | 5/2002 | Carpenter et al. .......... 296/26.09 |
| 6,432,160 B1 | | 8/2002 | Norville et al. |
| 6,491,331 B1 | * | 12/2002 | Fox .......................... 296/26.09 |
| 6,659,524 B1 | * | 12/2003 | Carlson .................... 296/26.09 |

FOREIGN PATENT DOCUMENTS

| | | |
|---|---|---|
| JP | 1-133692 | 5/1989 |
| JP | 10-128516 | 5/1998 |

OTHER PUBLICATIONS

U.S. Appl. No. 29/181797 filed May 15, 2003 A.D.
U.S. Appl. No. 60/423631 filed Nov. 4, 2002 A.D.
U.S. Appl. No. 09/825131 filed Apr. 3, 2001 A.D.
U.S. Appl. No. 10/139618 filed May 6, 2002 A.D.
Bedslide (TM) by IFW Inc., home, Bedslide XL w/instructions, etc., printed Oct. 17, 2003.

* cited by examiner

*Primary Examiner*—Stephen Gordon
(74) *Attorney, Agent, or Firm*—Christopher John Rudy

(57) ABSTRACT

Vehicle pull out drawer frame mounting system can include an angled bracket having a first end and a second and which projects substantially normal to the first end, the first ends each having a fastener-receiving hole. The angled bracket can be employed as a mediating bracket in combination with a stationary frame for a vehicle pull out drawer device or system, which includes a cross-member that can receive the first end of the angled bracket and accommodate fastening of the bracket through a fastener that is received by the fastener-receiving hole of the first end of the bracket. The combination can be fastened to a cargo area of a vehicle that has a wall defining a boundary of the cargo area that can receive a fastener which fastens the mediating, angled bracket through the fastener-receiving hole of the second end of the bracket.

19 Claims, 2 Drawing Sheets

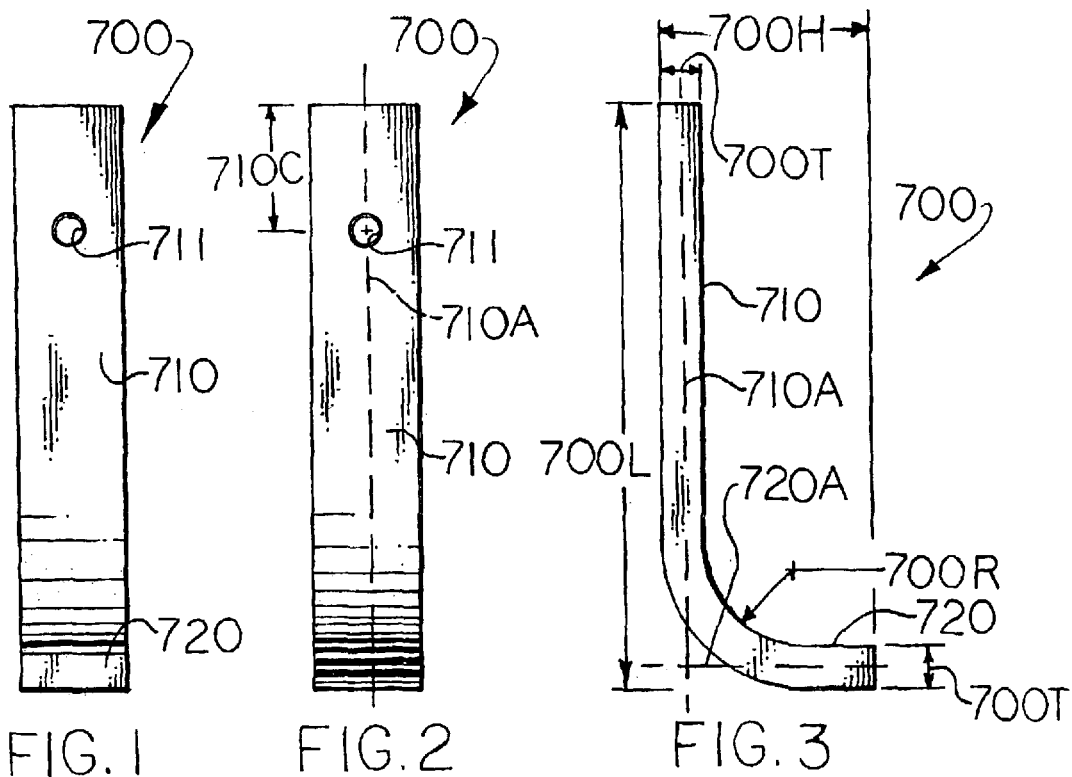
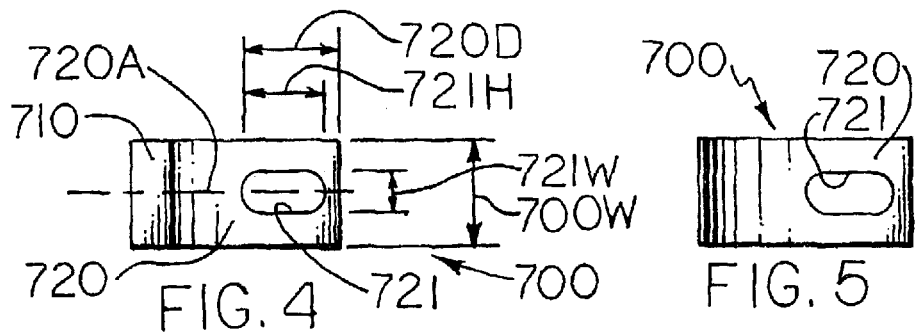
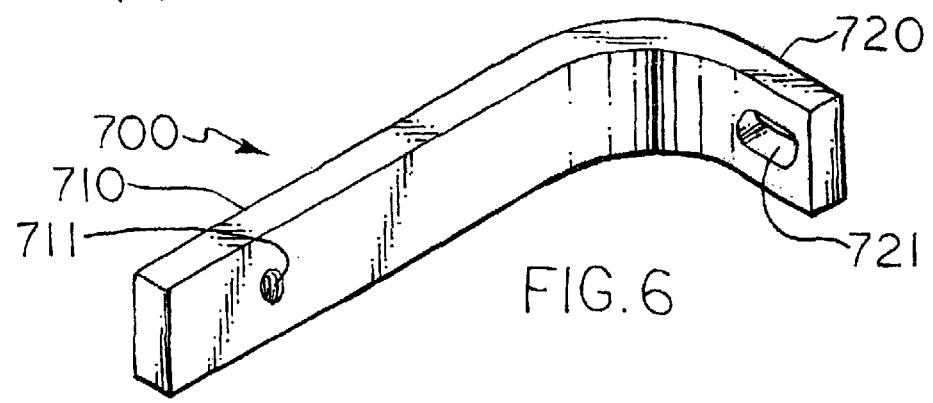

FRAME TO VEHICLE CARGO AREA MOUNTING

This is a continuation-in-part of U.S. design patent application Ser. No. 29/181797 filed by Express Mail (Label No. ER 089896095 US) on May 15, 2003 A.D. Although superceded by the present specification, the complete specification of that design is incorporated herein by reference.

BACKGROUND TO THE INVENTION

I. Field and Purview

The present invention concerns a system for mounting a stationary frame of a pull out drawer device/system for a vehicle to a cargo area of the vehicle through a mediating bracket. For example, the frame can be that for a Chevy Avalanche pickup truck and that which has been provided with tubular cross members, with the bracket an L-shaped type bracket insertable into the tube and fixable to the tube and the sides of the cargo bed of the pickup.

II. Known Art and Problems

Various pull out drawer devices are available for mounting to the beds of pickup trucks. Premier devices among these are those of U.S. Pat. No. 6,328,364 B1 to Darbishire and provisional U.S. patent application No. 60/423,631 by Montagna et al.

As excellent as such devices and such a system are, mounting of the same to the beds of pickup trucks can present its own set of problems. Not the least of these is the invasive nature of the mounting where holes are drilled in the cargo bed floor through which bolts pass to secure the stationary frame of the pull out drawer device or system. Such takes time and, although very secure in effect, can result later in rust about the hole. In addressing the problem, in addition to that set forth in the '364 B1 patent, Darbishire et al., in U.S. patent application Ser. Nos. 09/825,131 and 10/139,618, respectively disclosed an easy to install pull out cargo-carrying tray frame for pickup trucks, and a quick-installing, quick-releasing frame for pull out drawer system for pickup trucks, other vehicles and trailers, etc. As useful as such art is, however, it has some shortcomings, especially in relation to taking advantage of particular accessories already in place on existing vehicle models.

It would be desirable to ameliorate or solve such problems.

A SUMMARIZATION OF THE INVENTION

In general, the present invention provides a vehicle pull out drawer frame mounting system, comprising an angled bracket having a first end and a second and which projects substantially normal to the first end, the first end having a fastener-receiving hole and the second end having a fastener-receiving hole. The angled bracket can be employed as a mediating bracket in combination with a stationary frame for a vehicle pull out drawer device or system, which includes a cross-member that can receive the first end of the angled bracket and accommodate fastening of the bracket through a fastener that is received by the fastener-receiving hole of the first end of the bracket. The combination can be fastened to a cargo area of a vehicle that has a wall defining a boundary of the cargo area that can receive a fastener which fastens the mediating, angled bracket through the fastener-receiving hole of the second end of the bracket.

The invention is useful in cargo management.

Significantly, by the invention, one or more problems in the art are ameliorated or solved, and the art is advanced in kind. In particular, attachment of a pull out drawer system is made easier, faster and more secure, especially in such vehicles as the Chevy Avalanche pickup truck, which has tie-down contrivances already in place in the side walls of its cargo area.

Numerous further advantages attend the invention.

THE DRAWINGS IN BRIEF

The drawings form part of the present specification. With respect to the drawings, which are not necessarily drawn to scale, the following is briefly noted:

FIG. 1 is a top view of an angled bracket of the invention.

FIG. 2 is a bottom view of the bracket of FIG. 1.

FIG. 3 is left side view of the bracket of FIG. 1.

FIG. 4 is a front view of the bracket of FIG. 1.

FIG. 5 is a rear view of the bracket of FIG. 1.

FIG. 6 is a perspective view of the bracket of FIG. 1.

ILLUSTRATIVE DETAIL OF THE INVENTION

Figure 7:
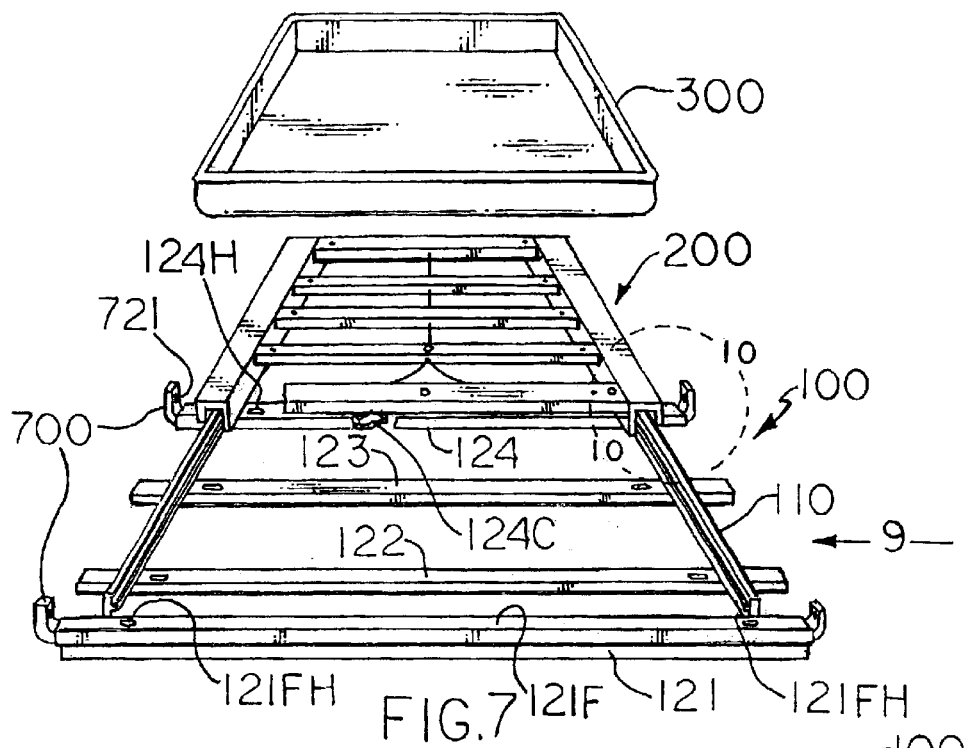
FIG. 7 is a front (intended cab to tailgate end) view of the bracket of FIGS. 1–6 in combination with a vehicle pull out drawer system, partially exploded.
Figure 9:
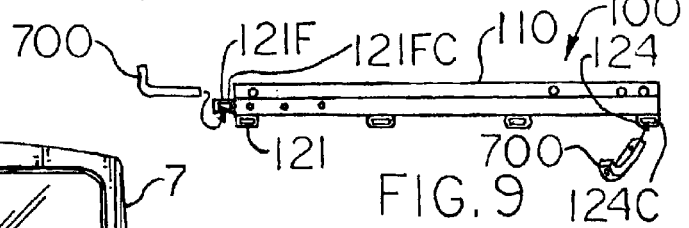
FIG. 9 is a side plan view of the subcombination found within FIGS. 7 and 8, taken in the direction of the arrow 9 of FIG. 7.
Figure 8:
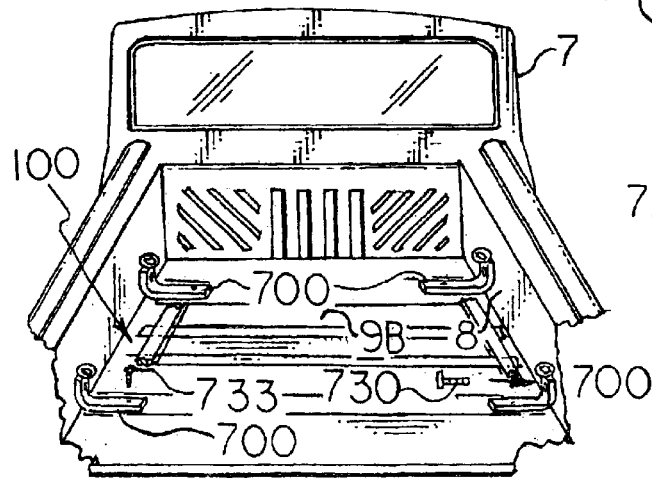
FIG. 8 is a rear (tailgate to cab end) perspective plan view of the bracket and stationary frame subcombination from the combination of FIG. 7, being mounted to the vehicle.
Figure 10:
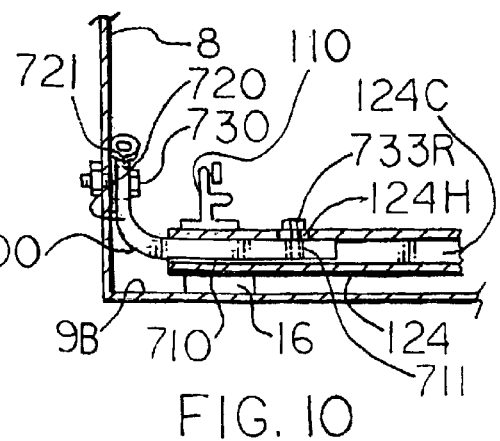
FIG. 10 is a rear plan view, in partial section, of a rear, left side part of the bracket and stationary frame subcombination found in FIGS. 7–9, generally within the circle 10 of FIG. 7, and mounted to the vehicle.

The invention can be further understood by the present detail, which may be read in view of the drawings. The same is to be taken in an illustrative and not necessarily limiting sense.

With respect to the drawings, vehicle 7, for example, the Chevy Avalanche pickup truck, includes a cargo area having side walls 8 and bed floor 9B. A vehicle pull out drawer system, for example, as generally disclosed by the '364 B1 patent or Montagna et al., U.S. provisional patent application No. 60/423,631 filed on Nov. 4, 2002, the complete specifications of which are incorporated herein by reference, can include lower pad 16 for stationary frame 100; movable frame 200 and cargo-carrying member 300, for example, a tray. The frame 100 can have parallel side rails 110 and a plurality of cross-members 121, 122, 123, 124. Cross-member 121 may be augmented by front cross-member 121F. Cross-members may be tubular or have any other suitable shape, for example, of square type tubing with rectangularly shaped core 121FC, 124C. Bracket-fastener receiving holes 121FH, 124H may be present, and be in any suitable form, for example, laterally directed slots. Preferably, into each core 121FC, 124C on the four "corners" of the frame 100 is inserted angled bracket 700.

The bracket 700, the body of which may be made of any suitable material, for example, aluminum stock, can include first end 710, which defines first axis 710A, and second end 720, which defines second axis 720A and projects substantially normal to the first end 710. In the first end 710 is fastener-receiving hole 711, which, for example, may be circular, centered along the axis 710A, and tapped to a ⅜-16 size (SAE) thread. In the second end 720 is fastener-receiving hole 721, which, for example, may be in the form of a slot centered and extending along the axis 720A. Any suitable construction, shape and dimensions may be provided the bracket 700. Advantageously, however, the bracket 700 is made from one piece and is made in an L-shape with a rounded connection between the legs or ends 710, 720. Exemplary dimensions, which may be considered to be approximate, may be those such as follows:

| No. | Comment |
|---|---|
| 700H | Height, 3.156 inches. |
| 700L | Length, 7.125 inches. |
| 700R | Radius, 1.250 inches. |
| 700T | Thickness, 0.5000 inches. |
| 700W | Width, 1.210 inches. |
| 710C | Distance to center of hole, 2.000 inches. |
| 720D | Distance to end of slot, 1.125 inches. |
| 721H | Height of slot, 0.937 inches. |
| 721W | Width of slot, 0.438 inches. |

The bracket 700, for example, made of the aluminum stock, may be left as is or painted or anodized any suitable color, say, black.

The angled bracket 700 can be employed as a mediating bracket in combination with the stationary frame 100 for a vehicle pull out drawer device or system 100, 200, 300. In preferred practice of the invention, as alluded to above, into the cross-members 121F, 124, the first end 710 of each of four brackets 700 is inserted, and the upraised second end 720 of the bracket 700 is attached to the side wall 8 of the vehicle 7. Screws 730, 733 and 733R may be employed as the fasteners. Each of the first ends 710 of the two brackets 700 which will go near the cab end of the cargo bed 9B into the cross-member 121F can be loosely fastened with the screw 733, which may be, for example, a ⅜-16×¾-inch serrated flange bolt; and each of the first ends 710 of the two brackets 700 which will go near the tailgate end of the cargo bed 9B into the cross-member 124 can be loosely fastened with the screw 733R, which may be, for example, a ⅜-16× ½-inch serrated flange bolt. Then the stationary frame 100 can be positioned so that each of the brackets 700 is near the; walls 8, for example, under the already present tie-downs of the Chevy Avalanche pickup truck, which have thread-receiving units present thereabout; and four screws 730, for example, M10-1.5×55-mm hex flange bolts, inserted, one each through the holes 721 and into the thread-receiving units in the pickup truck walls 8. Of course, without already-present thread-receiving units in the side walls 8, one of ordinary skill could provide after-market expedients for thread-receiving units, such as holes and nuts. The frame 100 and brackets 700 are adjusted, and then the screws 730, 733, 733R are tightened, whereupon the movable frame 200 and tray 300 can be attached to the stationary frame that has been so attached through the mediating brackets 700 to the vehicle 7.

CONCLUSION TO THE INVENTION

The present invention is thus provided. Various features, parts, subcombinations and combinations can be employed with or without reference to other features, parts, subcombinations or combinations in the practice of the invention, and numerous adaptations and modifications can be effected within its spirit, the literal claim scope of which is particularly pointed out as follows:

We claim:

1. An angled bracket for mediating mounting of a vehicle pull out drawer frame mounting system to a cargo area of a vehicle having a wall defining the cargo area, comprising a bracket body having a first member having a first end and a second member having a second end, which projects substantially normal to the first member, with the first and second members intersecting at an intersection, the first member projecting substantially longer from the intersection to the first end then the second member projects to the second end, the first member having a fastener-receiving hole, and the second member having a fastener-receiving hole in a form of a slot—wherein the intersection has a substantial radial component; the fastener-receiving hole of the first member is found in its entirety substantially further from the intersection than length of the second member from the intersection to the second end of the bracket, is circular, centered along an axis defined by length of the first member from the intersection to the first end of the bracket, and tapped to receive a threaded screw; and the fastener-receiving hole of the second member in the form of the slot is centered and extends along an axis defined by the length of the second member of the bracket.

2. In combination, at least one angled bracket for mediating mounting of a vehicle pull out drawer frame mounting system to a cargo area of a vehicle having a wall defining the cargo area, which embraces a bracket body having a first end and a second end that projects substantially normal to the first end, with the first end having a fastener-receiving hole, and the second end having a fastener-receiving hole; and mounted to the at least one bracket through a first fastener, a stationary frame for a vehicle pull out drawer device or system, which includes a cross-member that receives the first end of the at least one bracket and can accommodate fastening of the at least one bracket through the first fastener that is received by the fastener-receiving hole of the first end of the at least one bracket—wherein the fastener-receiving hole of the first end of the bracket is circular, centered along an axis defined by the first and of the bracket, and tapped to receive a threaded screw; the fastener-receiving hole of the second end of the bracket is in a form of a slot centered and extending along an axis defined by the second end of the bracket; and the first fastener is the threaded screw.

3. The combination of claim 2, further including the vehicle having the cargo area and the wall defining the boundary of the cargo area that can receive a second fastener, which fastens the at least one bracket through the fastener-receiving hole of the second end of the at least one bracket, to which is fastened with the second fastener the at least one bracket and stationary frame, with the at least one bracket mediating fastening between the frame and the wall defining the boundary of the cargo area that can receive the second fastener.

4. The combination of claim 2, wherein a movable frame and a cargo-carrying member are attached to the stationary frame.

5. The combination of claim 3, wherein a movable frame and a cargo-carrying member are attached to the stationary frame.

6. The combination of claim 2, wherein the stationary frame has mounted thereto at least four in number of the at least one bracket.

7. The combination of claim 3, wherein the stationary frame has mounted thereto at least four in number of the at least one bracket.

8. The combination of claim 4, wherein the stationary frame has mounted thereto at least four in number of the at least one bracket.

9. The combination of claim 5, wherein the stationary frame has mounted thereto at least four in number of the at least one bracket.

10. In combination, at least one angled bracket for mediating mounting of a vehicle pull out drawer frame mounting system to a cargo area of a vehicle having a wall defining a boundary of the cargo area, which embraces a bracket body having a first member having a first end terminus and a second member having a second end terminus that projects substantially normal to the first member, with the first and second members intersecting at an intersection, the first member projecting substantially longer from the intersection to the first end terminus than the second member projects to the second end terminus, the first member projecting to the first end terminus in an elongate form that has a length from the intersection to the first end terminus substantially greater than a width taken normal to the length of the first member, the first member having a fastener-receiving hole, and the second member having a fastener-receiving hole; and mounted to the at least one bracket, a stationary frame for a vehicle pull out drawer device or system, which includes a cross-member that receives the first end terminus and a suitable remaining part of the first member of the at least one bracket and can accommodate fastening of the at least one bracket through a first fastener that is received by the fastener-receiving hole of the first member of the at least one bracket.

11. The combination of claim 10, wherein the fastener-receiving hole of the first member is found in its entirety substantially further from the intersection than length of the second member from the intersection to the second end terminus of the bracket, and is centered along an axis defined by length of the first member from the intersection to the first end terminus of the bracket; and the fastener-receiving hole of the second member is in a form of a slot.

12. The combination of claim 10, further including the vehicle having the cargo area and wall defining the boundary of the cargo area that can receive a second fastener, which fastens the at least one bracket through the fastener-receiving hole of the second member of the bracket, to which is fastened with the second fastener the at least one bracket and stationary frame, with the at least one bracket mediating fastening between the frame and the wall defining the boundary of the cargo area that can receive the second fastener.

13. The combination of claim 12, wherein the wall defining the boundary of the cargo area that can receive the second fastener is a side wall.

14. The combination of claim 10, wherein a movable frame and a cargo-carrying member are attached to the stationary frame.

15. The combination of claim 11, wherein a movable frame and a cargo-carrying member are attached to the stationary frame.

16. The combination of claim 12, wherein a movable frame and a cargo-carrying member are attached to the stationary frame.

17. The combination of claim 14, wherein the stationary frame has mounted thereto a plurality of the at least one bracket.

18. The combination of claim 15, wherein the stationary frame has mounted thereto a plurality of the at least one bracket.

19. The combination of claim 16, wherein the stationary frame has mounted thereto a plurality of the at least one bracket.

\* \* \* \* \*